(12) United States Patent
Barrus et al.

(10) Patent No.: US 8,286,083 B2
(45) Date of Patent: Oct. 9, 2012

(54) COPYING DOCUMENTS FROM ELECTRONIC DISPLAYS

(75) Inventors: John W. Barrus, Menlo Park, CA (US); Gregory J. Wolff, Palo Alto, CA (US); Kenneth F. Gudan, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 963 days.

(21) Appl. No.: 11/685,496

(22) Filed: Mar. 13, 2007

(65) Prior Publication Data
US 2008/0278437 A1 Nov. 13, 2008

(51) Int. Cl.
*G06F 3/033* (2006.01)
(52) U.S. Cl. .......................... 715/745; 715/737
(58) Field of Classification Search ................. 715/745, 715/746, 747, 748
See application file for complete search history.

(56) References Cited

U.S. PATENT DOCUMENTS

| | | | |
|---|---|---|---|
| 4,688,928 A * | 8/1987 | Iwai | 399/19 |
| 5,051,839 A * | 9/1991 | Nakahara et al. | 358/401 |
| 5,510,896 A * | 4/1996 | Wafler | 358/296 |
| 5,790,279 A * | 8/1998 | Sakellaropoulos | 358/498 |
| 5,854,694 A * | 12/1998 | Payne et al. | 358/473 |
| 5,872,552 A * | 2/1999 | Gordon et al. | 345/107 |
| 6,278,513 B1 * | 8/2001 | Murata et al. | 355/44 |
| 6,594,503 B1 * | 7/2003 | Herzig et al. | 455/550.1 |
| 6,781,823 B1 * | 8/2004 | Nyack | 361/679.29 |
| 2004/0017361 A1 * | 1/2004 | Lieu | 345/169 |
| 2008/0005239 A1 * | 1/2008 | Podl | 709/204 |
| 2008/0080010 A1 * | 4/2008 | Korst | 358/401 |

* cited by examiner

*Primary Examiner* — Mark Rinehart
*Assistant Examiner* — Meseker Takele
(74) *Attorney, Agent, or Firm* — Patent Law Works LLP

(57) ABSTRACT

A system including a Multi Function Printer/Product/Peripheral (MFP) and a portable computing device adapted to allow automatic copying of documents by the MFP from the portable computing device. The portable computing device includes a display, a plurality of sensors for detecting light, a light detection module and a page changing module. The sensors are positioned to detect light from the MFP and trigger a page change automatically. The MFP in accordance with the present invention includes a scanner with a platen, a page change detection module, an image processing module, a device identification module, and a document matching & retrieval module. The page change detection module is adapted to receive the images presented by the portable computing device on the platen of the scanner for copying. The page change detection module detects changes and causes the MFP to scan and output a copy.

23 Claims, 11 Drawing Sheets

COPYING DOCUMENTS FROM ELECTRONIC DISPLAYS

BACKGROUND OF THE INVENTION

The present invention relates to portable computing devices and Multi Function Printers/Products/Peripherals (MFPs). More particularly, the present invention relates to portable computing devices and MFPs that allow for the automatic copying of documents displayed by portable devices.

The use and proliferation of portable computing devices has become widespread. In particular, there are a number of small computing devices such as personal digital assistants (PDAs), smart phones, tablet computers, digital cameras, video games and laptop computers that include electronic display devices. These display devices allow the user to interact with the device using a pen or stylus and provide a display for presenting information and inputting command selections. The size of such displays is ever increasing, making documents, images and video more viewable and common place. For example, a prior art system includes a pen or stylus and a computing device. The computing device comprises a touch panel of a conventional type that has a display and a touch sensitive input.

However, one particular problem for such portable computing devices is that it is very difficult to transfer data from the portable computing device and have it printed by a photocopier or MFP. If a user is viewing a document on a tablet personal computer, for example, it is very difficult to print pages displayed by that device on a photocopier. One method of the prior art for printing out a document displayed by a tablet personal computer requires: first establishing a network connection, then installing a print driver for the photocopier upon which the document is to be printed, and finally sending the print command and the document from the tablet personal computer to the photocopier. This process is time consuming, often requires repeated attempts, and requires significant user input and time. It is only made even more difficult because establishing a network connection is a manual process often requiring several input steps by the user. Printing also presents a security risk because the document to be printed may contain sensitive information. The user must somehow ascertain that the printer that appears on the network is indeed the printer which is physically nearby.

Another equally difficult method of the prior art for printing a document displayed on a tablet computer that also introduces security issues is to: transfer the document from the tablet computer to a networked computer connected to the photocopier, open the document on the networked computer, assuming the networked computer has an application that can access and display the document, and print the document using the networked computer.

Finally, the user of the tablet computer could employ a completely manual process to have the document photocopied. For example, the user could display a document and select a page for display by tablet computer, place the tablet computer face down on the platen of the photocopier, press the copy button of the photocopier, remove the tablet computer from the platen, select the next page for display by the tablet computer, and then repeat this process for every page in the document.

Thus, there does not exist in the prior art a method for an MFP to easily and automatically copy documents from the display of the portable computing device.

SUMMARY OF THE INVENTION

The present invention overcomes the deficiencies of the prior art with a system including a Multi Function Printer/Product/Peripheral (MFP) and a portable computing device adapted to allow automatic copying of documents by the MFP from the portable computing device.

In one or more embodiments, the portable computing device of the present invention includes: a display, a plurality of sensors for detecting light, a light detection module and a page changing module. The sensors are positioned proximate the display to detect light from the MFP and trigger a page change automatically. The sensors are coupled to the light detection module. The light detection module determines whether the input from the sensors is a scan by an MFP. Once the end of the scan has been detected by the light detection module, it sends a signal to the page changing module to update the display of the portable computing device to the next page of the document. Thus, the user need only place the portable computing device on the platen of the MFP and repeatedly select the copy button and then the entire document will be copied.

The MFP in accordance with the present invention includes: a scanner with a platen and in one embodiment a page change detection module and a document matching & retrieval module. The page change detection module is adapted to receive the images presented on the platen of the scanner for copying. In one embodiment, the page change detection module detects changes and cause the MFP to scan and output a copy. In another embodiment, the MFP also includes an image processing module and a device identification model. Once an image has been scanned by the MFP, the image can be processed by the image processing module using input from the device identification module to generate a copy that only includes the document or content that was shown in display area of the portable computing device. In other words, the MFP uses image processing to remove those areas of the scanned image that are merely a copy of the housing of the portable computing device. In yet another embodiment, the document matching is performed on the scanned image and the original electronic document is retrieved from storage by the MFP and used to generate the copy output instead of the scanned image.

The features and advantages described herein are not all-inclusive, and in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
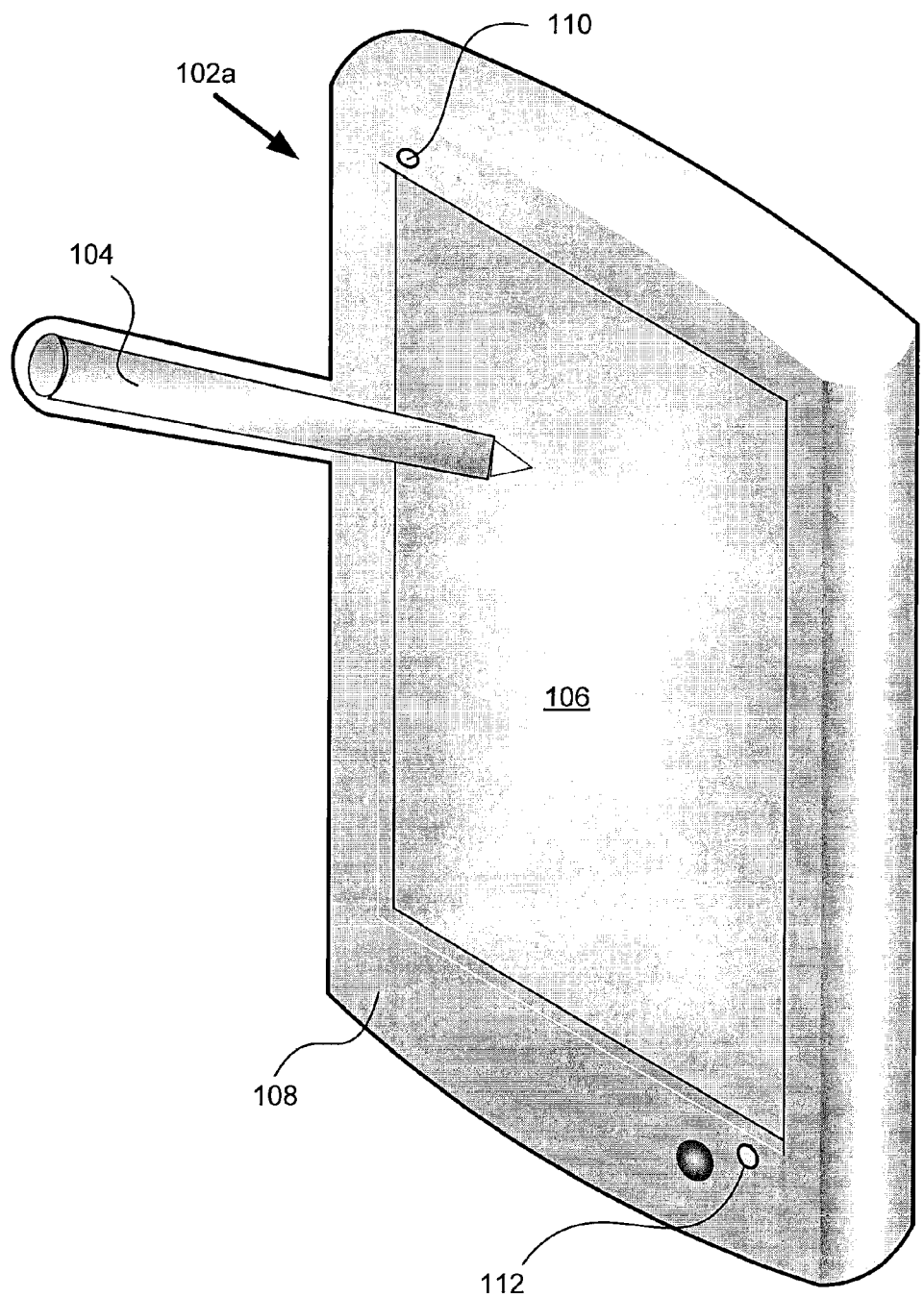
FIG. 1 is a perspective view of an embodiment of a portable computing device in accordance with the present invention.

A system and methods for copying documents from electronic displays are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to an embodiment of an electronic display for a portable computing device that is a tablet computer, but the invention is applicable to any computing device that has an electronic display, including but not limited to smart phones, mobile phones, personal digital assistants (PDA), digital cameras, gaming devices, portable video players and laptop computers.

Reference in the specification to "one embodiment," "an embodiment" or "the embodiment' means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System

The system of the present invention includes various embodiments. In one embodiment, the system requires only a portable computing device 102 (see FIG. 1) adapted in accordance with the present invention. In a second embodiment, the system requires only an MFP 500 (see FIG. 5) adapted in accordance with the present invention. In a third embodiment, the system comprises the portable computing device 102 and the MFP 500 adapted in accordance with the present invention and cooperating with each other.

Portable Computing Device

Referring now to FIG. 1, an embodiment of a portable computing device 102a in accordance with the present invention is shown. In this example embodiment, the portable computing device 102a is a tablet personal computer. FIG. 1 shows a perspective view of the portable computing device 102a with an outer housing 108 holding and enclosing an electronic display 106 for outputting information to the user. The user can manipulate a stylus 104 to provide input commands and data to the tablet computer 102a. In accordance with the present invention, the front side of the housing 108 defines apertures for receiving a plurality of sensors 110, 112. In one embodiment, the plurality of sensors 110, 112 are light sensors, flash sensors or image sensors. A first sensor 110 is positioned on the periphery of the display 106 proximate the upper left corner of display 106. The second sensor 112 is positioned on the periphery of display 106 proximate the lower right corner of the display 106. Thus, the light sensors 110, 112 can be used in combination to detect when the MFP 500 begins its scan and completes its scan. In an alternate embodiment, a single light sensor positioned proximate the periphery of the display 106, for example, near the center side of the display 106 is used.

Figure 2:
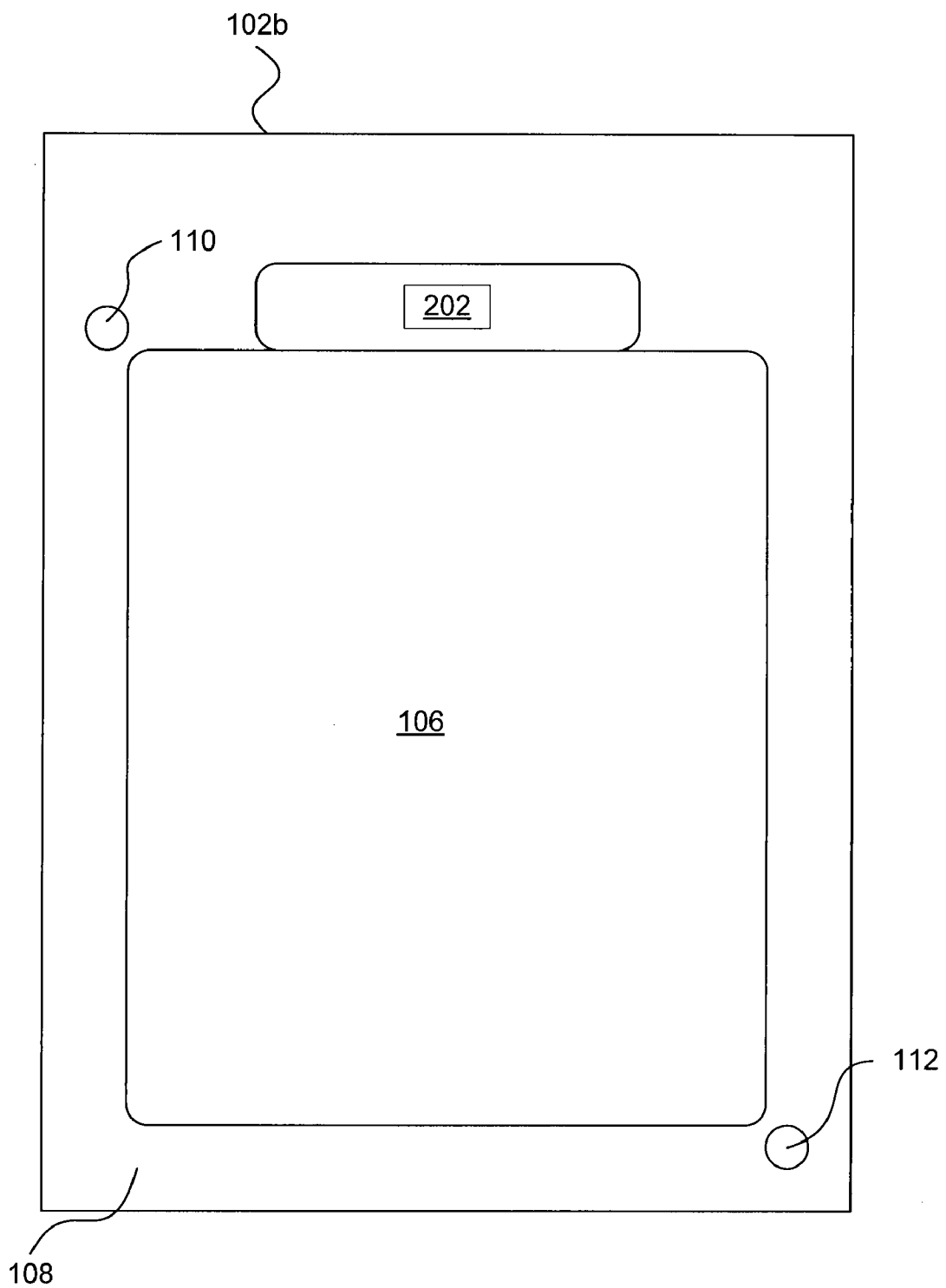
FIG. 2 is top plan of another embodiment of the portable computing device in accordance with the present invention.

Referring now to FIG. 2, another embodiment of the portable computing device 102b is shown. Again, in this embodiment the portable computing device 102b is a tablet computer. This embodiment of the portable computing device 102b includes many of the same components as the first embodiment described above with reference to FIG. 1. Like reference numerals are used to refer to components, and the description of the components described above will not be repeated here. The second embodiment of the portable computing device 102b also includes a secondary display 202. The secondary display 202 is, for example, an Organic Light Emitting Diode (OLED). The secondary display 202 is used to display information that can be decoded by the MFP 500 as will be described in more detail below with reference to FIG. 5. In particular, the secondary display 202 may be used to display a QR code or other machine-readable code that identifies the document being displayed by a primary display 106 as well as other information. In certain embodiments, this allows the portable computing device 102b and the MFP 500 that are both adapted in accordance with the present invention to interact with each other to provide indirect mechanisms for transfer, identification of and communication about documents and pages output by the MFP 500.

Figure 3:
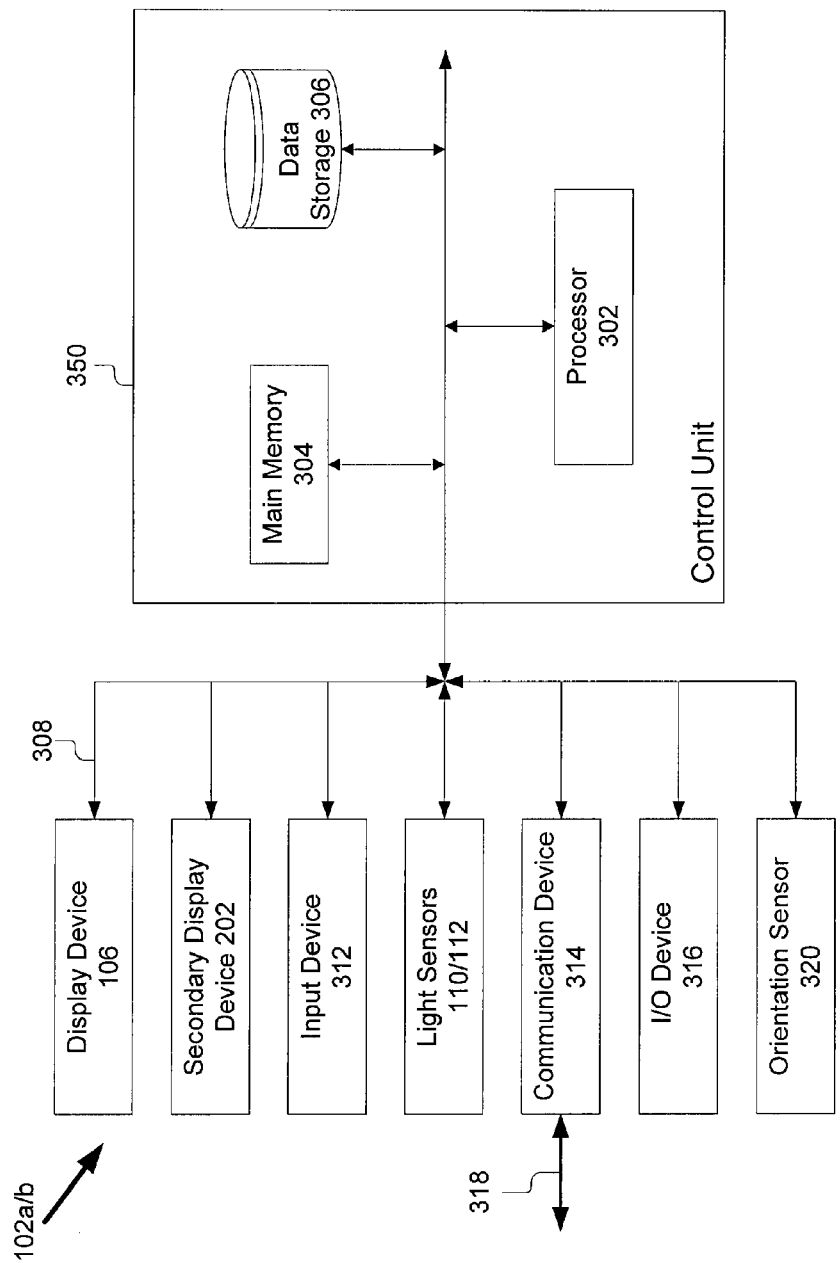
FIG. 3 is a block diagram of an embodiment of the portable computing device in accordance with the present invention.

Referring now also to FIG. 3, a functional block diagram of the portable computing device 102 configured in accordance with embodiments of the present invention is shown. The portable computing device 102 preferably comprises a control unit 350, the display device 106, an input device 312 and the one or more light sensors 110, 112. The portable computing device 102 may optionally include a communication device 314 and one or more input/output (I/O) devices 316.

The control unit 350 comprises an arithmetic logic unit, a microprocessor, a general purpose computer or some other information appliance equipped to provide electronic display signals to display device 106. In one embodiment, the control unit 350 comprises a general purpose computer having a graphical user interface, which may be generated by, for example, a program written in Java running on top of an operating system like WINDOWS® or UNIX® based operating systems.

Still referring to FIG. 3, the control unit 350 is shown including processor 302, main memory 304 and data storage device 306, all of which are communicatively coupled to system bus 308.

Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included.

Main memory 304 stores instructions and/or data that may be executed by processor 302. The instructions and/or data may comprise code for performing any and/or all of the techniques described herein. Main memory 304 may be a dynamic random access memory (DRAM) device, a static random access memory (SRAM) device, or some other memory device known in the art. The memory 304 is described in more detail below with reference to FIG. 4.

Data storage device 306 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage device 306 includes electronic versions of the documents shown on the display device 106.

System bus 308 represents a shared bus for communicating information and data throughout control unit 350. System bus 308 may represent one or more buses including an industry standard architecture (ISA) bus, a peripheral component interconnect (PCI) bus, a universal serial bus (USB), or some other bus known in the art to provide similar functionality.

Additional components coupled to control unit 350 through system bus 308 include the display devices 106 and 202, the input device 312, the sensors 110, 112, the communication device 314 and the I/O device(s) 316.

The display device 106 represents any device equipped to display electronic images and data as described herein. In one embodiment, the display device 106 is a liquid crystal display (LCD) similar to those on many conventional portable computing devices to provide status feedback, operation settings and other information to the user. In other embodiments, the display device 106 may be any one of existing paper-like displays with high reflectivity. The display device 202 may be of a similar type construction and coupling.

In one embodiment, the input device 312 is a series of buttons coupled to the control unit 350 to communicate information and command selections to processor 302. The buttons are similar to those on any portable computing device 102, and may be assignable to a function. In one embodiment, input device 312 is a digitizer in which a touch-sensitive, transparent panel covers the screen of display device 106. In yet another embodiment, the input device 312 includes cursor control. Cursor control represents a user input device equipped to communicate positional data as well as command selections to processor 302. Cursor control may include a trackball, a stylus, a pen, a touch screen, cursor direction keys or other mechanisms to cause movement of a cursor.

The portable computing device 102 may optionally include the communication devices 314 and one or more input/output (I/O) devices 316 such as described below.

The communication devices 314 may be a network controller that links control unit 350 to a network 318 that may include multiple processing systems. The network of processing systems may comprise a local area network (LAN), a wide area network (WAN) (e.g., the Internet), and/or any other interconnected data path across which multiple devices may communicate. The control unit 350 also has other conventional connections to other systems such as a network for distribution of files (media objects) using standard network protocols such as TCP/IP, http, https, and SMTP as will be understood to those skilled in the art. The communication device 314 in other embodiments includes a Bluetooth® transceivers, wireless transceivers, or infrared transceivers for communication along a channel 318.

One or more I/O devices 316 are coupled to the bus 308. These I/O devices 316 are part of portable computing device 102 in one embodiment. The I/O device 316 may also include audio input/output device equipped to receive audio input via a microphone and transmit audio output via speakers. Optionally, an I/O audio device may contain one or more analog-to-digital or digital-to-analog converters, and/or one or more digital signal processors to facilitate audio processing.

It should be apparent to one skilled in the art that the portable computing device 102 may include more or less components than those shown in FIG. 3 without departing from the spirit and scope of the present invention. For example, the portable computing device 102 may include additional memory, such as, for example, a first or second level cache, or one or more application specific integrated circuits (ASICs). Similarly, additional components may be coupled to control unit 350 including, for example, an RFID tag reader, digital still or video cameras, or other devices that may or may not be equipped to capture and/or download electronic data to control unit 350. One or more components could also be eliminated.

Figure 4:
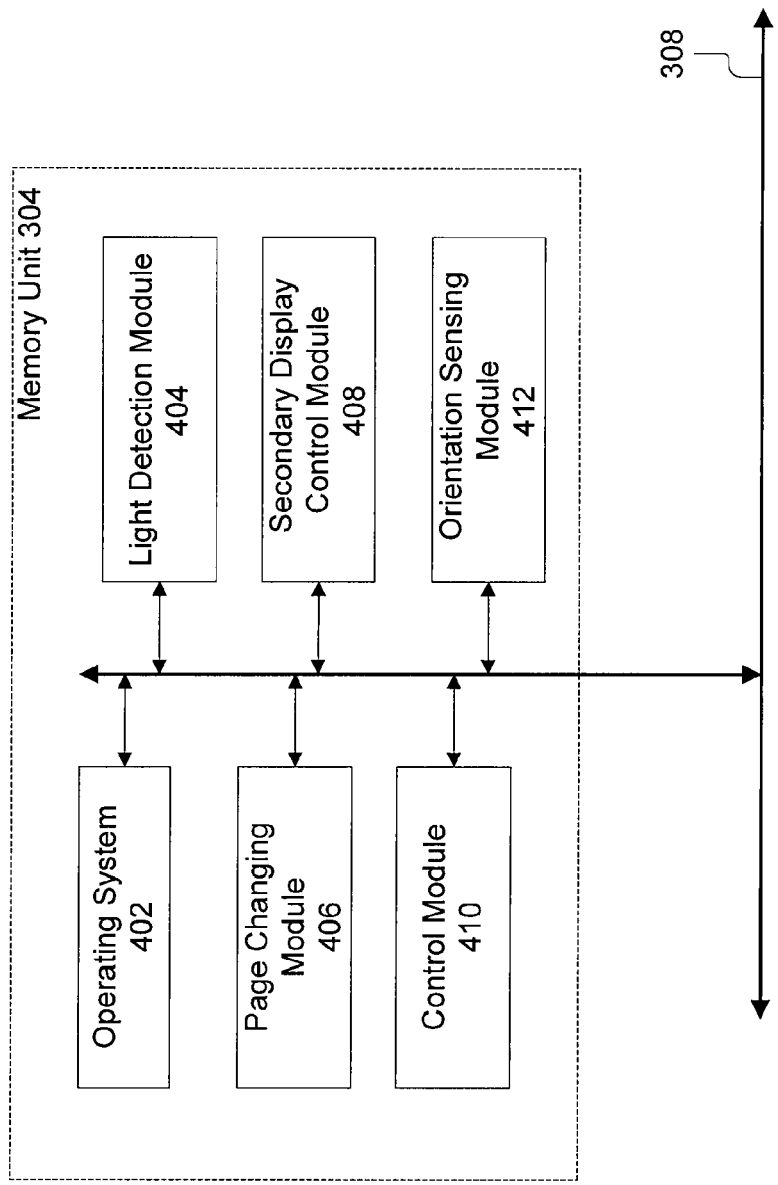
FIG. 4 is a block diagram of an embodiment of a memory for the portable computing device of FIG. 3 in accordance with the present invention.

FIG. 4 is a block diagram of one embodiment of the memory unit 304 for the portable computing device 102. The memory unit 304 preferably comprises: an operating system 402, a light detection module 404, a page changing module 406, a secondary display control module 408 and a control module 410. Those skilled in the art will recognize that the memory 304 also includes buffers for temporarily storing data. The memory unit 304 stores instructions and/or data that may be executed by processor 302. The instructions and/or data comprise code for performing any and/or all of the techniques described herein. These modules 402-410 are coupled by bus 308 to the processor 302 for communication and cooperation. Those skilled in the art will recognize that while the present invention will now be described as modules or portions of a memory unit 304 of the portable computing device 102, the modules or portions thereof may also be stored in other media such as permanent data storage device 306.

The operating system 402 is preferably a custom operating system that is accessible to the user via an application interface. In an alternate embodiment, the operating system 402 is one of a conventional type such as a WINDOWS®, SOLARIS® or LINUX® based operating systems. Although not shown, the memory unit 304 may also include one or more application programs executed by control unit 350 including, without limitation, drawing applications, word processing applications, electronic mail applications, financial applications and web browser applications.

The light detection module 404 is software and routines for determining whether the MFP 500 has scanned the document displayed by the portable computing device 102. The light detection module 404 is coupled to receive signals from the light sensors 110, 112. In one embodiment, the light detection module 404 remains in a ready state until a signal is received from one of the light sensors, for example light sensor 110. Once the first light sensor 110 has detected the presence of light above a predetermined threshold, the light detection module 404 monitors the second light sensor 112 for a light detection signal. Once the second light sensor has detected the presence of light above a predetermined threshold, the scanner of the MFP 500 has passed by both the first light sensor 110 and the second light sensor 112 and scanning of the display 106 is complete. In response to detection of light by the second light sensor 112, the light detection module 404 generates a signal indicating that a page has been scanned. This signal is provided to the page changing module 406 either directly or via the control module 410. In an alternate embodiment with only a single light sensor, the light detection module 404 monitors for a signal indicating the presence of light from the single sensor above a predetermined threshold. Then after a predetermined amount of time, the light detection module 404 generates and sends a signal indicating the page has been scanned. Those skilled in the art will recognize that the sensitivity of the light sensors 110, 112 may also be adjusted, the time period allowed between light detection signals from the sensors 110, 112 and other filtering and logic may be performed by the light detection module 404. For example, the portable computing device 102 may provide a mode in which the light sensors 110, 112 and the light detection module 404 are activated or set to a mode to detect light and trigger automatic page changing. Those skilled in the art will further recognize that the light detection module 404 can operate independent of the order in which the light sensors 110, 112 generate their signals indicating the presence of light. Therefore, regardless of the orientation at which the user places the portable computing device 102 on the MFP 500, the light detection module 404 produces the appropriate signal indicating the page has been scanned. In yet another embodiment where the light sensor is an image sensor, the light detection module 404 generates a page scan signal by comparing images collected by the image sensor at different times to determine when the scanned by the MFP 500 has been completed.

The page changing module 406 comprises software and routines for advancing or updating the page displayed by the portable computing device 102. The page changing module 406 is coupled to the light detection module 404. The page changing module 406 is also coupled for communication and control with the operating system 402 and the application being used by the portable computing device 102 to display a document. Upon receiving a signal indicating that the current display of the portable computing device 102 has been scanned from the light detection module 404, the page changing module 406 modifies the display of the document being presented by the portable computing device 102 to advance it by one screen display.

The secondary display control module 408 is software and routines for controlling the secondary display 202. The secondary display control module 408 retrieves or generates the code and displays it on the secondary display 202. The code displayed by the secondary control module 408 corresponds and is used to identify the document and page being displayed by the portable computing device 102 on the primary display 106. The secondary display control module 408 is optional and only used for those embodiments like that shown in FIG. 2 that include a secondary display 202. It should be noted that the code displayed by the secondary display device 202 may be a barcode, a QR code, or any similar code that contains encoded data. Furthermore, in addition to the document name, document location and document page being displayed by the portable computing device 102, the type or model of the portable computing device 102 may also be encoded into the code. The optional orientation sensing module 412 is used to determine when the portable computing device 102 is upside down. If desired, the light detection module 404 or page changing module 406 can be disabled when the device is in all other orientations so that the pages don't change due to flashes of bright light that are not related to the MFP.

The control module 410 is used to control the other modules 404, 406, 408, 412 of the memory unit 304. The control module 410 is adapted for control of and communication with the light detection module 404, the page changing module 406, the secondary display control module 408 and the orientation sensing module 412. The operation of the control module 410 will be apparent from the description of FIGS. 8 and 9 below. While the control module 410 is shown as a separate module of the memory 304, those skilled in the art will recognize that the control module 410 in another embodiment may be distributed as routines in the other modules 402-408.

With the light sensor 110, 112, it is possible to detect the light from the scanner 602 and trigger a page change automatically. This means that a document can be copied page by page simply by setting it on the MFP 500 with the initial page displayed and repeatedly pressing the copy key. The main benefit of the present invention described here is that usable documents can be printed out without establishing an electrical connection between the MFP 500 and the electronic display 106. Making an optical connection between the MFP 500 and the display 106 is much easier and will work with most any copier.

Figure 5:
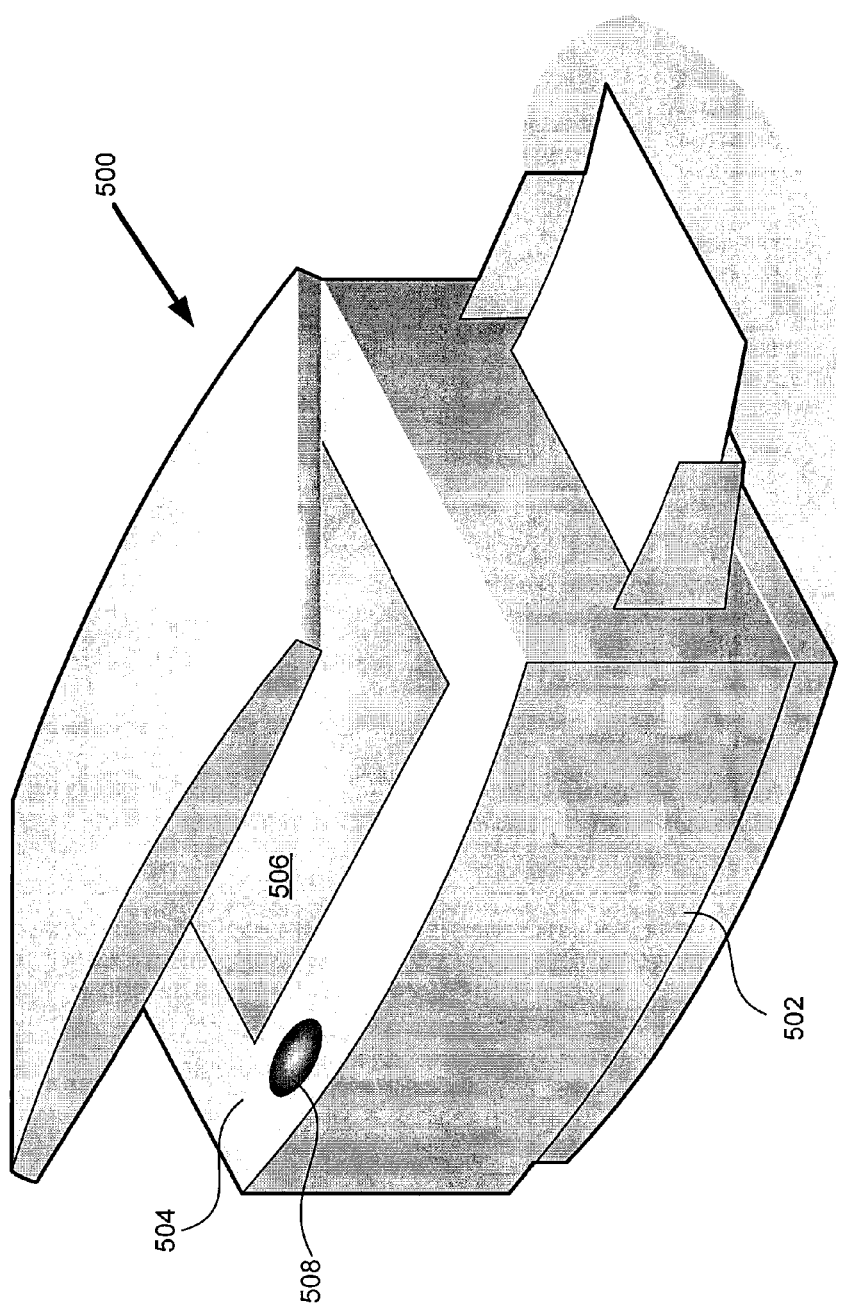
FIG. 5 is a perspective view of an embodiment of an MFP in accordance the present invention.

Referring now to FIG. 5, an embodiment of the MFP 500 in accordance with the present invention is shown. The MFP 500 includes a housing 502 including a top 504. On the top of the MFP 500, a copy button 508 is positioned proximate the front side of the MFP 500. The top side of the MFP 500 also exposes a platen 506 for placing documents or objects to be copied. Although not shown, in an alternate embodiment, the MFP 500 may include additional buttons such as for selecting an automatic copying mode for the MFP 500.

Figure 6:
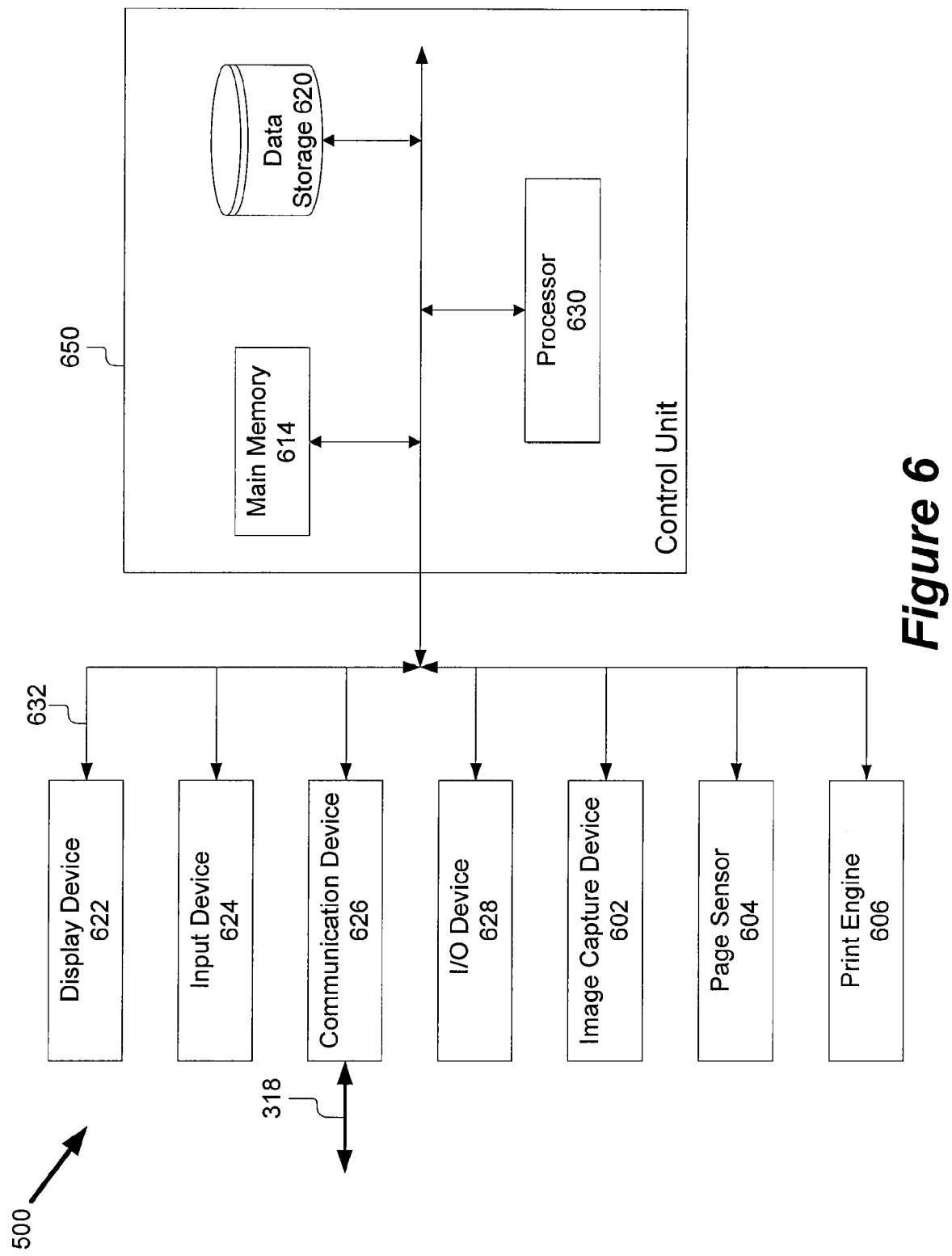
FIG. 6 is a block diagram of an embodiment of the MFP in accordance with the present invention.

Referring now to FIG. 6, a block diagram of the MFP 500 is shown. In addition to the features of the present invention, the MFP 500 includes functionality similar to that of a conventional MFP much of which is not described here but will be understood to those skilled in the art. In one embodiment, the MFP 500 includes a control unit 350, a display device 310, an input device 312, a communication device 314, one or more input/output devices 316, an image capture device 602, a page sensor 604 and a print engine 606.

Some of the components of the MFP 500 have a similar functionality to the components of the portable computing device 102. Those components differ in functionality in that they are not adapted to be portable, and therefore, may take forms with increased computing capacity, increased size and increased performance. For example, the data bus 632, the control unit 650, the input device 624, and the communication device 626, the one or more I/O devices 628 have a similar basic functionality as described above. However, these devices differ from the embodiments for the portable computing device 102 in at least the following respects.

The data bus 632, for example is representative of multiple data buses rather than the single bus 308. Multiple buses allow fast transfer of image data from a scanning device to the printing device, and simultaneous data transfer of user interface information to a display device, for example.

The control unit 650 includes within the data storage 620 a database of various original electronic documents printable by the MFP 500. The data storage 620 may include indices and other mechanisms for storage and retrieval of thousands of electronic documents. Furthermore, the memory unit 614 differs in configuration and functionality as compared with the memory unit 304 of the portable computing device 102. This functionality is described in more detail below with reference to FIG. 7.

In one embodiment, the input device 624 for the MFP 500 includes a keyboard. The keyboard can be a QWERTY keyboard, a key pad, or representations of such created on a touch screen. In yet another embodiment, the input device 624 includes cursor control as has been described above and a series of buttons coupled to control unit 650 to communicate information and command selections to processor 630.

The image capture device 602 in one embodiment is an image scanner for capturing an image of a document. The image capture device 602 is positioned within the housing 502 beneath the platen 506. The image capture device 602 is capable of optically scanning a document or display and generating a digital representation. For example the image capture device 602 may be any one of a conventional type including those employing CCDs, contact image sensor or similar imaging technology. The image capture device 602 is coupled to the bus 632 for communication with the processor 630.

In addition to the image capture device 602, the page sensor 604 is housed within the MFP 500. The page sensor 604 includes any device capable of sensing the image visible on the platen 506 and detecting page changes. In one embodiment, the page sensor 604 is a linear sensor within the housing 502 of the MFP 500. In a second embodiment, the page sensor is a camera sensor housed within the MFP 500. For example, the page sensor 604 may sense blanking in the image. Alternatively, the page sensor 604 may perform a difference function over time to detect page changes. The page sensor 604 is coupled by bus 632 to the processor 630.

Finally, the MFP 500 includes the print engine 606 for generating documents. The print engine 606 is of a conventional type and is coupled to bus 632 for communication with the processor 630. The print engine 606 provides conventional printing capabilities to generate and output printed documents based on data and commands from the processor 630.

Figure 7:
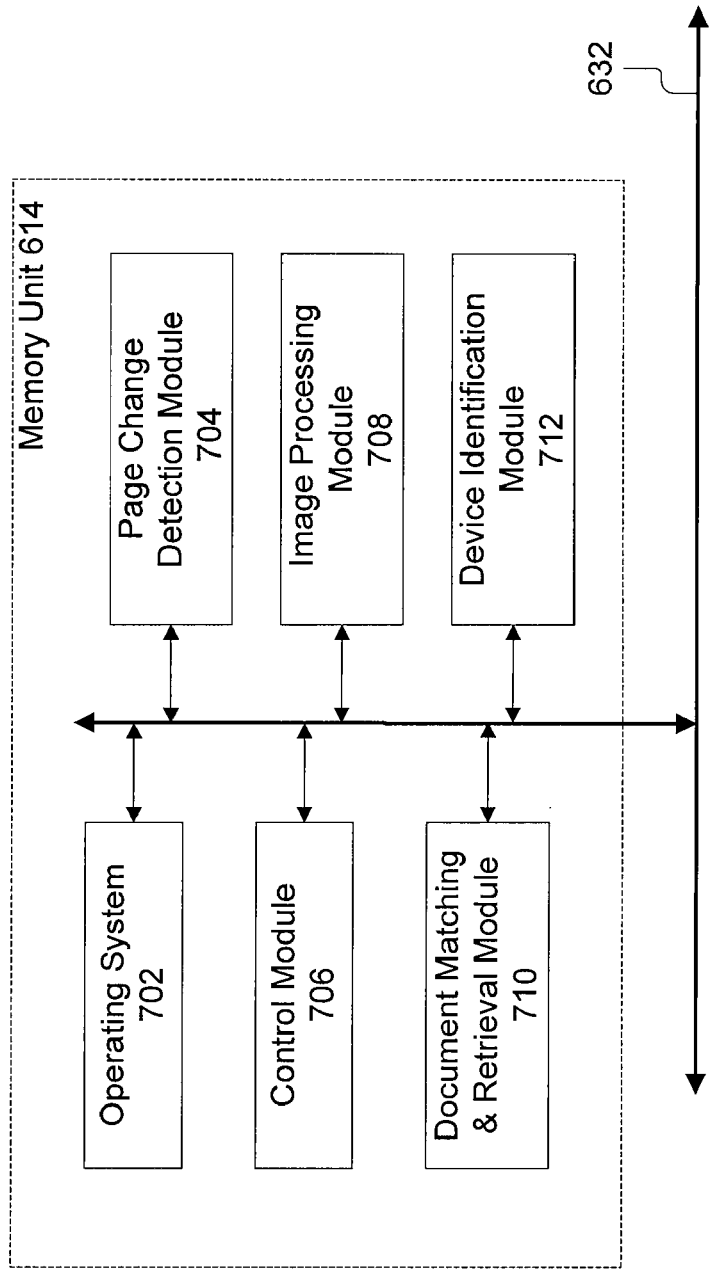
FIG. 7 is a block diagram of an embodiment of a memory for the MFP of FIG. 6 in accordance with the present invention.

Referring now to FIG. 7, an embodiment of the memory unit 614 for the MFP 500 is shown. The memory unit 614 comprises an operating system 702, a page changed detection module 704, a control module 706, and an image processing module 708, a document matching & retrieval module 710, and a device identification module 712. The memory unit 614 stores instructions and/or data that may be executed by processor 630. The instructions and/or data comprise code for performing any and/or all of the techniques described herein. These modules 702-712 are coupled by bus 632 to the processor 630 for communication and cooperation.

The operating system 702 for the MFP 500 is similar to that described above and may be any proprietary operating system for the particular MFP 500.

The page changed detection module 704 comprises software routines for detecting a change in the image that is present on the platen 506. The page changed detection module 704 is coupled to receive signals from the page sensor 604. In one embodiment, the page changed detection module 704 is responsible for causing the MFP 500 to begin another scan. In another embodiment, the page changed detection module 704 receives image data from the page sensor 604; is responsible for calculating a difference between images received at different times; and determines whether the image received at the platen 506 indicates a page change. For example, the portable computing device 102 may be placed on the platen 506 face down and set to automatically change the information that is displayed. Responsive to the information being changed by the portable computing device 102, the page changed detection module 704 detects the difference in the output by the portable computing device 102, and signals the MFP 500 to capture of scan of the newly presented page.

The control module 706 is software and routines to control the other modules 704, 708, 710 and 712 of the memory unit 614. The control module 706 is adapted for control of and communication of these modules 704, 708, 710 and 712. The operation of the control module 706 will be apparent from the description of FIGS. 9, 10A and 10B. While the control module 706 is shown as a separate module of the memory 614, those skilled in the art will recognize that the control module 706 in another embodiment may be distributed as routines in the other modules 704, 708, 710 and 712.

The image processing module 708 is software and routines for performing image processing on the image data collected and output by the image capture device 602. The image processing module 708 is coupled to the image capture device 602, the device identification module 712 and the document matching & retrieval module 710. The image processing module 708 processes the scanned image captured by the MFP 500 for a number of different purposes.

In one embodiment, the image processing module 708 crops and scales the image data received from the capture device 602 to remove portions of the image around the border that are unused and that are a copy of the housing 108 of the portable computing device 102. The remaining portion of the image that captured the display 106 is scaled or enlarged to match the user selected size of the output. For example, the image processing module 708 receives a signal from the device identification module 712 that identifies the portable computing device 102. The image processing module 708 then uses the identification information for size and image attributes that would be representative of the housing 108 the identified portable computing device 102. This information can then be used to remove border portions of the image that are not part of the display 106. This information can also be used to scale the image to maximize its size for the output.

In another embodiment, the image processing module 708 is used to extract the code within a captured image. For example, when the second embodiment of the portable computing device 102 is used, either the secondary display 202 or the primary display 106 shows a code identifying the document, the page and a location from which the document can be electronically retrieved. When the image of the identifying code is captured, the image processing module 708 extracts the portion of the image corresponding to the identifying code, and performs recognition on that portion of the image to identify the corresponding code. This code can then be sent by the image processing module 708 to the document matching & retrieval module 710.

The document matching & retrieval module 710 is software and routines for retrieving an electronic version of a document corresponding to an image captured by the MFP 500. It has been noted above with reference to the image processing module 708 that the present invention can advantageously also include an ability to retrieve an original electronic version of a document and use it to generate the output of the MFP 500. This is advantageous because the image quality for an image of the portable computing device 102 may be poor whereas if the original document being displayed by the portable computing device 102 can be obtained and used for printing, the output document will be of the highest quality available. The document matching & retrieval module 710 is coupled to the image processing module 708 to receive a signal identifying the original electronic document and other related information. The document matching & retrieval module 710 is also coupled to the data storage 620 for accessing documents that have been electronically stored therein. The document matching & retrieval module 710 compares, locates and identifies the document if possible. If a document has been identified, the document matching & retrieval module 710 generates a request to print a portion of the electronic document being displayed by the portable computing device 102 as determined by the information received from the image processing module 708. For example, if the portable computing device 102 is displaying the fifth page of a given document, the document matching & retrieval module 710 will determine a corresponding electronic version of the document, retrieve the electronic version of the document, identify the fifth page of the document, and generate and send instructions and information that cause the fifth page to be printed by the print engine 606.

The device identification module 712 is software and routines for identifying the type of portable computing device 102 from an image captured by the image capture device 602. As has been explained above, the image processing module 708 has the ability to remove from the captured image portions that represent the housing 108 of the portable computing device 102. To assist the image processing module 708, the device identification module 710 provides information about the type of portable computing device 102 found within the image. In one embodiment, the device identification module 712 uses information from the code extracted from the secondary display area 202. In another embodiment, the device identification module 712 includes a library of known portable computing devices and images of their housing and display areas. This library can be used by the device identification module 712 to recognize a particular type of device and provide information to the image processing module 708 to improve cropping.

Methods

Figure 8:
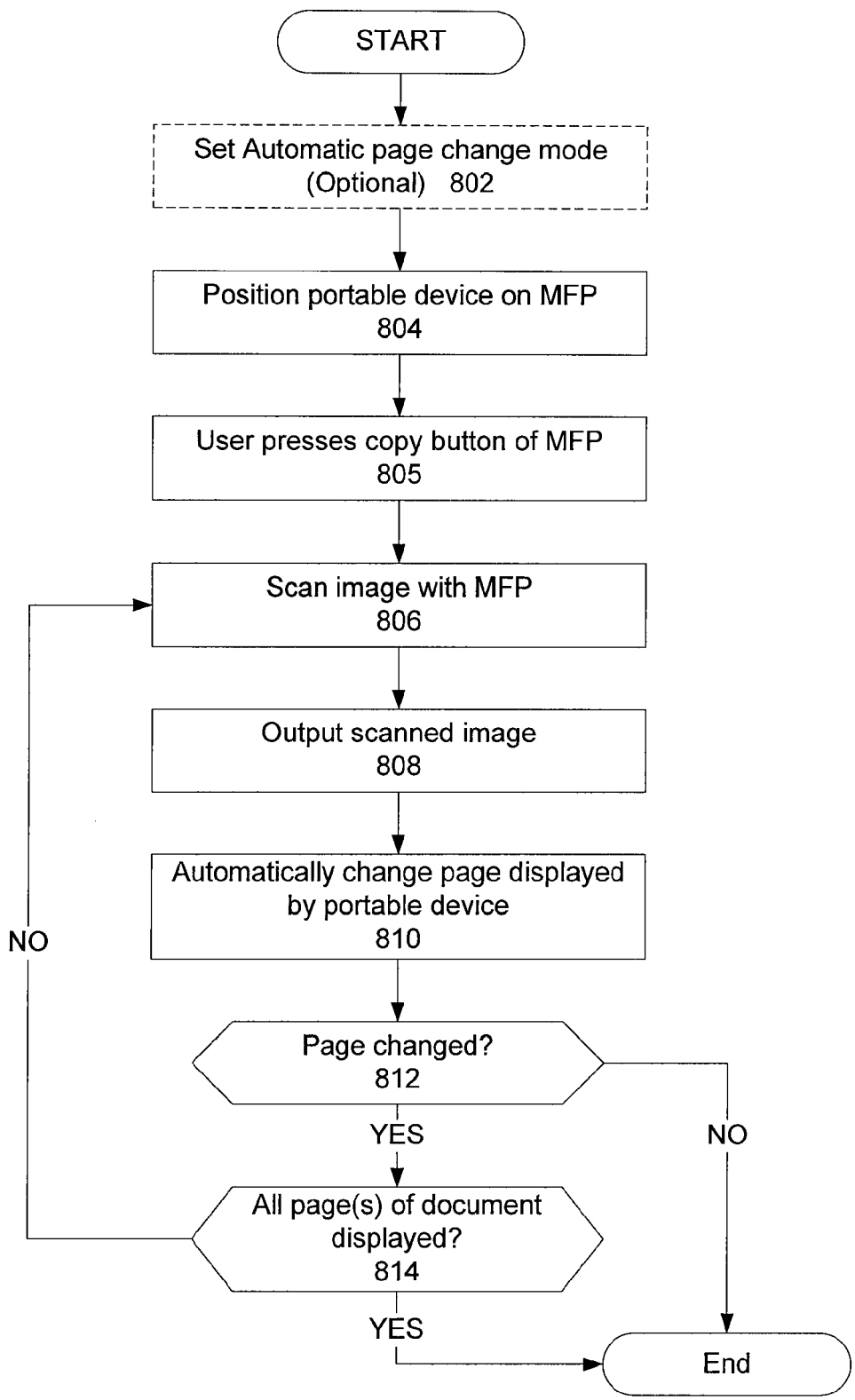
FIG. 8 is a flow chart of an embodiment of a process for automatically copying documents from a portable computing device in accordance with the present invention.

Referring now to FIG. 8, the method for performing automatic copying will be described. The method described below with reference to FIG. 8 is operational on a system that includes a portable computing device 102 enhanced with the present invention as well as the MFP 500 enhanced with the present invention. The process begins by setting 802 the portable computing device 102 and the MFP 500 to the automatic page change mode. Those skilled in the art will recognize that step 802 is optional and different embodiments of the invention can operate without it. Next, the user positions the portable computing device 102 on the MFP 500 in a position for photocopying. In particular, the portable computing device 102 is positioned such that its display 106 is positioned face-down on the platen 506 of the MFP 500. Then the user presses 805 the copy button of the MFP 500 to being the copying process. Then the MFP 500 scans 806 an image. The image is processed in a conventional manner and output 808. Next, the portable computing device 102 automatically changes 810 the page displayed after a specified time from when light above a threshold is detected by the light sensors 110, 112. Then the MFP 500 determines 812 whether the page has changed. If the page has not changed and a predetermined amount of time has elapsed, the method is complete and ends. If the page has changed the method continues to determine 814 if all page(s) of the document have been displayed. This can be determined in a variety of different ways. In one embodiment, the MFP 500 detects whether the portable computing device 102 has been removed from the platen 506 of the MFP such as detecting movement of the lid. For example, if the lid is moved from slightly ajar to completely open as would be the case when the user removes the portable computing device 102 from the platen 506 of the MFP 500 this movement can be detected. In a second embodiment, the MFP 500 and the portable computing device 102 communicate that all the pages have been displayed such as via audible communication, wireless communication or other method as will be understood by those skilled in the art. In yet a third embodiment, the MFP 500 detects whether a done or complete button on the MFP 500 has been selected. The lid being completely open, the detection of a chirp from the portable computing device 102 and detection of a signal from a completed button are just a few measures to determine whether all the pages have been displayed by the portable computing device 102 and/or the user has finished copying. Those skilled the in the art will recognize that there are various other ways for the invention to determine whether copying is complete. If all page(s) of the document have been displayed, the method is complete and ends since there are no more pages to copy. However, if not all page(s) of the document have been displayed, the method returns to step 806 for the new page and performs the steps of scanning, outputting and automatically changing the page.

Figure 9:
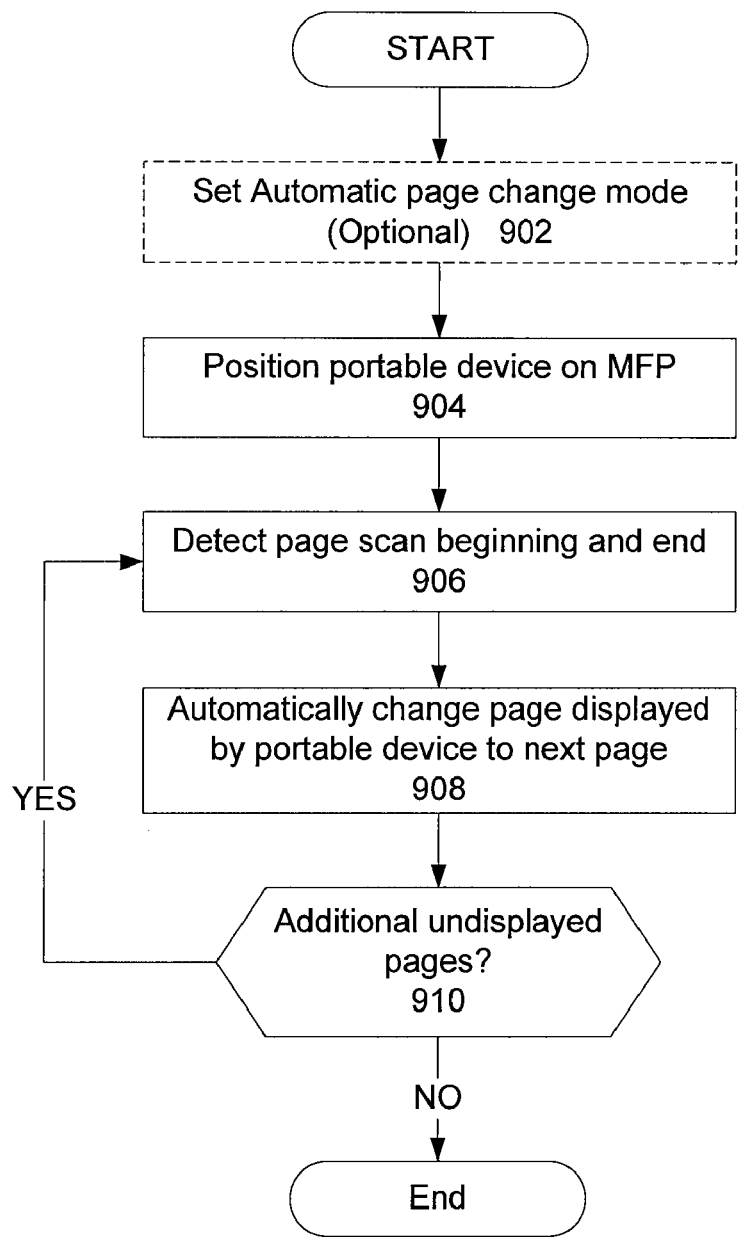
FIG. 9 is a flowchart of an embodiment of a process for a portable computing device to automatically copy documents in accordance with the present invention.

Referring now to FIG. 9, a method is described for performing automatic copying in accordance with one embodiment of the present invention where a portable computing device 102 enhanced with the present invention is used with a conventional MFP. The method begins by with the optional step of setting 902 the portable computing device 102 to operate in an automatic page change mode. In one embodiment, setting the device 102 to operate in automatic page change mode 902 can be done by turning the device 102 upside down. When the orientation sensor module 412 detects that the device 102 is upside down, it can cause the device 102 to enter the automatic page change mode 902 in the act of positioning the device on the MFP 904. This activates the light sensors 110, 112. If the orientation sensor module 412 is not used, the portable computing device 102 is then positioned 904 by the user on the MFP. The user then selects the copy button. In one embodiment, the user repeatedly selects a copy button. In an alternate embodiment, if the user knows the number of pages in the document, the user can input to the MFP a number of pages and then select the copy button once. The portable computing device 102 then detects 906 a page scan beginning and end. After the end of the page scan has been detected, the method transitions to step 908 to automatically change the page displayed by the portable computing device 102 to the next page. Then the portable computing device 102 determines 910 whether there are any additional pages in the document that have not been displayed. If so the method returns to step 906 to detect the beginning and end of a page scan. If there are no additional pages in the document, the method is complete in the process ends.

Figure 10A:
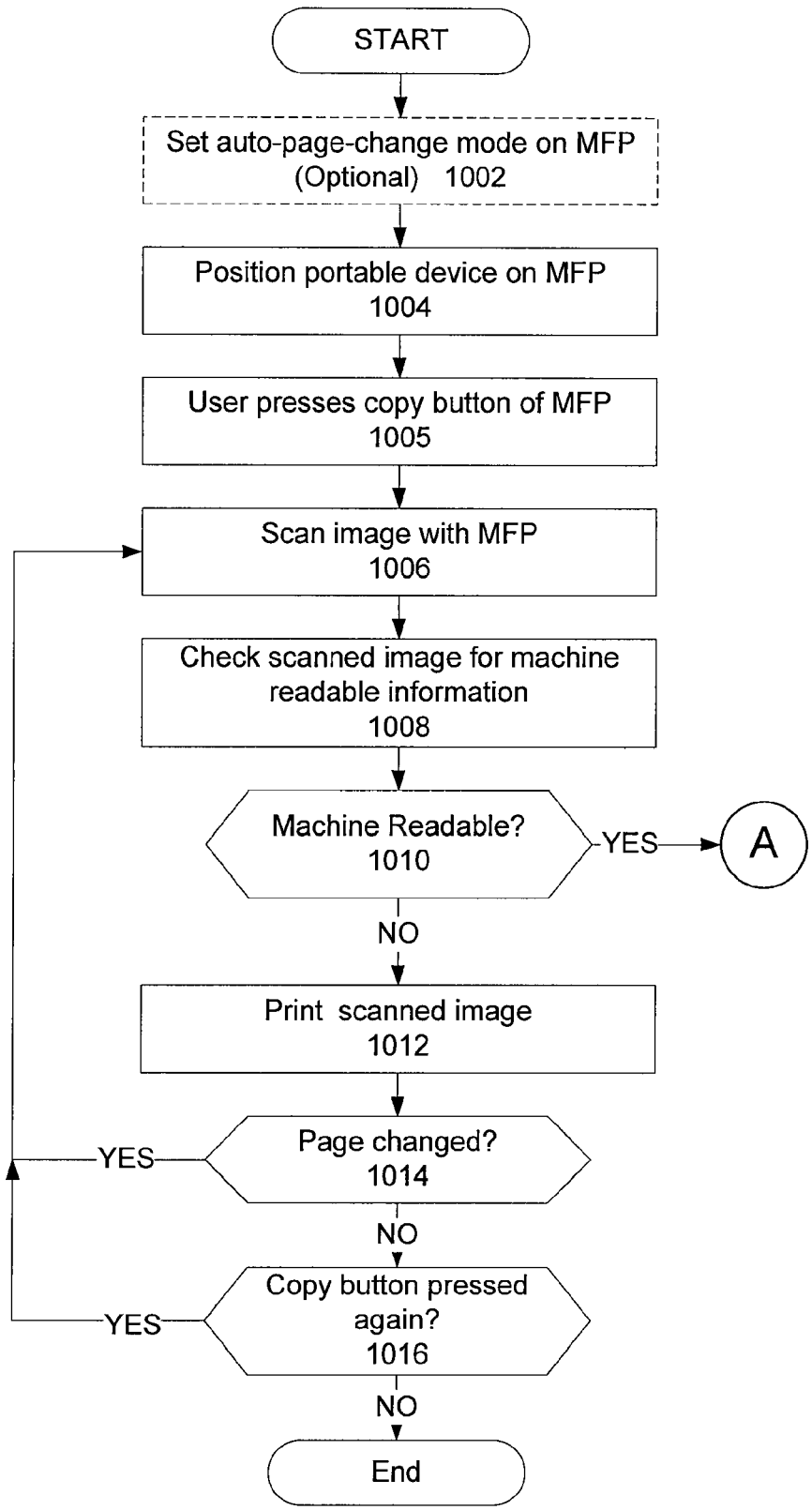
FIGS. 10A and 10B are a flowchart of an embodiment of a process for an MFP to automatically copy documents in accordance with the present invention.
Figure 10B:
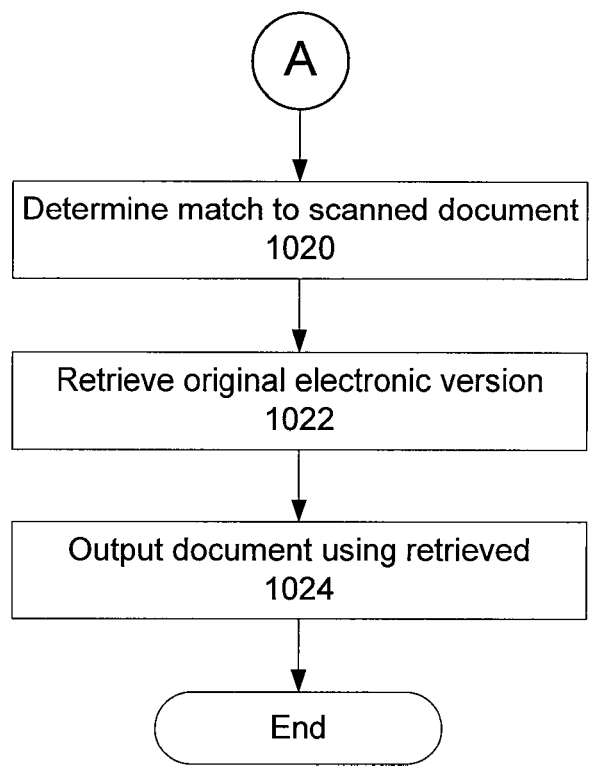

Referring now to FIGS. 10A and 10B, a method for performing automatic copying in accordance with yet another embodiment will be described. The method described with reference to FIGS. 10A and 10B, is for a scenario where the present invention is included within an MFP 500 and the MFP 500 is used with the conventional portable computing device. The method begins by optionally setting 1002 an automatic page change mode on the MFP 500. The portable computing device is then positioned 1004 on the MFP 500, and set to display a document, for example in slide show mode for a presentation in PowerPoint by Microsoft. Then the user presses the copy button on the MFP 500 to start the process on the MFP. Then the MFP 500 scans 1006 an image. The scanned image is then processed 1008 by the MFP 500 to check for machine readable information and determine 1010 whether the scanned image includes any machine readable information such as a QR code, bar code or the like. If the scanned image does include a machine readable code, the method continues in step 1020 of FIG. 10B. If there is a machine readable code in the scanned image, the MFP 500 will be coupled or include a server that has original electronic versions of the document. Rather than using the scanned image which is typically a lower quality, the MFP 500 uses the original image to generate the output document for the user. Even in embodiments, where the second embodiment of the portable computing device 102b is not used, the MFP 500 can locate a document using existing pattern matching techniques to compare a pattern of OCR'd text to a library of documents in electronic form. The method continues by determining 1020 matching document for the scanned image. The MFP 500 then retrieves 1022 the original electronic version of the matching document. Finally, the MFP 500 uses the original electronic version of the matching document to generate 1024 an output document, and a method is complete and ends.

If the scanned image does not include a machine readable code, the method continues in step 1012 and prints the scanned image. Next, method determines 1014 whether the page has changed. If the page has changed, the method returns to step 1006 to scan the image with the MFP 500 and performs the successive steps for the new page. If in step 1014 the page is not changed, the method determines 1016 whether the user has pressed the copy button again to start processing of another or a new document. If so, the method returns to step 1006 to scan the image with the MFP 500 and performs the successive steps for a new page. If not the method is complete and ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A portable computing device adapted for automatic optical communication, the device comprising:
    a primary display for presenting a document;
    a secondary display for presenting a machine readable code that identifies a type of the portable computing device;
    an orientation sensing module for determining an orientation of the device;
    a sensor for generating a signal in response to detecting a presence of a light above a predetermined threshold during a first scan of the primary display, the sensor being activated based on the orientation of the device;
    a detection module for determining a beginning and an ending of the first scan based at least in part on detecting the presence of the light above the predetermined threshold, the detection module having an input coupled to the sensor, and having an output to indicate the ending of the first scan of the primary display;
    an updating module having an input and an output, the updating module updating information shown on the primary display in response to the ending of the first scan, the input of the updating module coupled to the output of the detection module, and the output of the updating module coupled to control information shown on the primary display, wherein updating information shown on the primary display comprises changing from a first page of the document to a second page of the document; and
    a control module coupled to the detection module and the updating module, the control module for determining whether there is at least one additional undisplayed page of the document, and responsive to a presence of the at least one additional undisplayed page, instructing the detection module to determine the beginning and the ending of a second scan and instructing the updating module to update for the at least one additional undisplayed page.

2. The device of claim 1, wherein the primary display is an electrophoretic display.

3. The device of claim 1, wherein the sensor is one from the group of an image sensor, a light sensor and a flash sensor.

4. The device of claim 1, wherein the sensor includes a first sensor and a second sensor, the first sensor positioned proximate a first end of the primary display, and the second sensor positioned proximate a second opposite end of the primary display.

5. The device of claim 4, wherein the detection module determines that the primary display has been scanned if a first signal is received from the first sensor and a second signal is received from the second sensor.

6. The device of claim 1, wherein the orientation of the device is upside down.

7. The device of claim 1, wherein the updating module is a page changing module that advances the document being shown on the primary display by one screen display.

8. The device of claim 1, further comprising a secondary display control module coupled to and controlling information displayed on the secondary display.

9. A system adapted for automatic optical communication, the system comprising:
   an image capture device for receiving an optical image of a display presenting a document and for generating a digital representation of the optical image, the digital representation including a copy of a housing around the display;
   a sensor for capturing image data of the optical image and for detecting an update of the optical image of the display, wherein the update of the optical image of the display comprises changing from a first page of the document to a second page of the document;
   a change detection module for detecting a change in the optical image based on a difference between a first image and a second image that are captured by the sensor at different times, the change detection module having an input coupled to the sensor and generating a signal indicating the update of the optical image;
   a control module coupled to the change detection module and the image capture device, the control module causing the image capture device to generate the digital representation of the image in response to the update of the optical image of the display;
   a device identification module for identifying a type of portable computing device from the digital representation of the image, the device identification module adapted for communication with the image capture device, the device identification module providing the type of portable computing device; and
   an image processing module coupled to the image capture device to receive the digital representation of the image and coupled to the device identification module, the image processing module modifying the digital representation of the image by removing the copy of the housing based on the type of portable computing device and scaling the digital representation of the image.

10. The system of claim 9, wherein the sensor is one from the group of a linear sensor and a camera sensor.

11. The system of claim 10, wherein the sensor detects the update of the optical image of the display by sensing blanking in the optical image.

12. The system of claim 9, wherein the image processing module crops the digital representation of the image.

13. The system of claim 9, further comprising a document matching and retrieval module for retrieving an original document corresponding to the digital representation of the image, the document matching and retrieval module coupled to the image capture device and to a source of original documents.

14. The system of claim 9, wherein the device identification module identifies the type of portable computing device by extracting a machine readable code from the digital representation of the image that identifies the type of portable computing device.

15. A method for automatically copying a document from an electronic display, the method comprising:
   setting a primary display to operate in an automatic page changing mode;
   displaying the document on the primary display;
   displaying a machine readable code on a secondary display, the machine readable code identifying a type of a portable computing device;
   determining an orientation of the device;
   activating a sensor based on the orientation of the device;
   detecting, with the sensor, a presence of a light above a predetermined threshold during a first scan of the primary display;
   determining a beginning and an ending of the first scan of the primary display based at least in part on detecting the presence of the light above the predetermined threshold;
   updating the primary display in response to the ending of the first scan of the primary display by changing from a first page of the document to a second page of the document; and
   determining whether there is at least one additional undisplayed page of the document and responsive to a presence of the at least one additional undisplayed page, performing the steps of determining the beginning and the ending of a second scan of the primary display and updating for the at least one additional undisplayed page.

16. The method of claim 15, wherein the step of detecting the presence of the light is performed by a first sensor.

17. The method of claim 15, wherein the sensor includes a first sensor and a second sensor and wherein the step of detecting the presence of the light includes detecting the light at the first sensor and detecting the light at the second sensor.

18. The method of claim 15, wherein the step of automatically updating the primary display is performed a predetermined amount of time after the detecting step.

19. A method for automatically outputting information by a multifunction device from an electronic display that presents a document, the method comprising:
   capturing, with a sensor, image data of an optical image of the electronic display;
   detecting with the multifunction device a change in the optical image of the electronic display from a first page of the document to a second page of the document based on a difference between a first image and a second image that are captured by the sensor at different times;
   scanning an image of the electronic display in response to the change in the optical image of the electronic display, the image including a copy of a housing around the electronic display;
   identifying a type of portable computing device from the image of the electronic display;
   modifying the image of the electronic display by removing the copy of the housing based on the type of portable computing device and enlarging a portion of the image corresponding to the display to a size of an output document; and
   generating the output document.

20. The method of claim 19 further comprising setting the multifunction device to operate in an automatic page change detection mode.

21. The method of claim 19 further comprising determining whether to use an original electronic document for the step of generating the output document, and retrieving the original electronic document.

22. The method of claim 21 further comprising determining a matching original electronic document for the scanned image, retrieving the original electronic document, and generating the output document from the retrieved original electronic document.

23. The method of claim 19 further comprising processing the scanned image to remove portions of the scanned image corresponding to area outside of the display.

* * * * *